United States Patent [19]

Edmonds et al.

[11] Patent Number: 5,038,844
[45] Date of Patent: Aug. 13, 1991

[54] AUTO WINDOW SHADE

[76] Inventors: Joseph E. Edmonds, 17809 Crenshaw, #1, Torrance, Calif. 90504; Armando O. Lopez, 26345 Hillcrest Ave., Lomita, Calif. 90717

[21] Appl. No.: 608,170

[22] Filed: Oct. 31, 1990

[51] Int. Cl.⁵ .............................................. B60J 5/00
[52] U.S. Cl. .................. 160/370.2; 296/97.8
[58] Field of Search ............... 160/370.2, 368.1, 84.1, 160/354; 296/97.7, 97.8, 97.9

[56] References Cited

U.S. PATENT DOCUMENTS

| | | | |
|---|---|---|---|
| 4,560,245 | 12/1985 | Sarver | 296/97.8 X |
| 4,759,581 | 7/1988 | McNamee | 296/97.7 |
| 4,790,591 | 12/1988 | Miller | 296/97.7 X |
| 4,903,749 | 2/1990 | Hanania | 160/370.2 |

Primary Examiner—Blair M. Johnson
Attorney, Agent, or Firm—Roger A. Marrs

[57] ABSTRACT

An opaque, detachable shade is disclosed herein for covering the inside surface of a vehicle windshield, roof window, dashboard and the like, which includes a contoured sheet of pliable material of substantially the same size and shape of the windshield surface intended to be covered. A dashboard sheet and a roof window sheet are provided for covering other areas of the vehicle interior. A hook and pile fastener is carried along the edge marginal region of the shade with various sheets constituting sun shades. The window sills and dash areas include fasteners for detachably mounting the shade sheets across the inside of the respective window and dash areas. Reinforcement is included at each fastener location on the shade and a tab on the fastener permits grasping by the user for manual disengagement for removal of the shade.

1 Claim, 1 Drawing Sheet

AUTO WINDOW SHADE

BACKGROUND OF THE INVENTION

1. Field of the Invention

The present invention relates to shades for vehicles and, more particularly, to a novel window shade apparatus detachably connectable to the interior of a vehicle so as to substantially cover selected areas such as the window area, serving as a block to the rays of the sun, and other interior areas, such as the dashboard and the like.

2. Brief Description of the Prior Art

Window shades have been provided in the past for vehicles such as automobiles which are attached to the inside surface of the window by suction means, magnetic means or by frictional interference with the edge marginal regions of the window frame or sill. Difficulties and problems have been encountered when applying such conventional window shades in that they are relatively rigid and are not suitable for convenient storage in a folded or rolled condition when not in use. Also, attachment of the shade to the window not only mars or damages the window surface but requires permanent installation of the attachment means. Such a requirement necessitates skill in installation as well as the need for special tools and parts.

Another problem dealing with conventional auto window shades is that the majority of shades relate to the front windshield of the vehicle and that few shades are employed for the roof windows or the dashboard. In the few instances where side window shades have been used, the shades generally require extensive installation in the form of rollable spools about which the shade is wrapped when not in use as well as rigid construction so as to prevent suitable storage when not in use. In some instances, the shades have taken the form of screens and film material which are unsuited for constituting a blockage to the sun's rays. Such materials also include an internal material memory which resists folding, bending or the like when the material is manipulated into other configurations for storage purposes.

Still other problems have been encountered with conventional window shades which stem largely from the fact that the attachment means rapidly deteriorates at the point of connection with the edge marginal region of the shade itself so that the life of the shade is greatly reduced. In most instances, the edge marginal region about the fastener of a conventional side window shade tears or rips the shade material as the fastening means are manipulated to detach from connectors or fasteners carried on the window frame or sill.

Therefore, a long-standing need has existed to provide a novel shade apparatus suitable for mounting against the inside surface of a vehicle window wherein the attachment means are reinforced and will not readily rip or tear the material of the shade itself during attachment or disattachment from its operative position against the window. Also, the shade should be of suitable material for convenient folding, bending, or rolling whereby the shade may be convenitnetly stored when in its storage condition.

SUMMARY OF THE INVENTION

Accordingly, the above problems and difficulties are obviated by the present invention which provides a novel sunshade for placement in an operative position against the inside surface of an auto windshield, roof window and/or dashboard, which includes a sheet of opaque material intended as a sun ray blocker and which includes attachment about its edge marginal region for detachable fastening with the frame or sill of an auto windshield. A second roof window sheet and/or a third dash sheet may be attached to opposite upper and lower ends of the windshield sheet for covering the auto roof window and dashboard respectively. Preferably, the attachment means on the edge marginal region of the various sheets of shade material takes the form of a hook and pile fastener having a pair of closure members attached to the opposing edges of the shade material and the window frame or headliner material respectively. A feature of the invention resides in the fact that the closure members of the hook and pile fastener are attached to the edge marginal region of the shade with reinforcing means and which further include an extended tab which not only serves as a closure with respect to the closure on the window frame or material of the headliner but provides for grasping by the fingers of the user to promote disconnection when it is intended to store the shade itself.

Therefore, it is among the primary objects of the present invention to provide a novel opaque sunshade for placement against the inside surface of an auto windshield or roof window so that the rays of the sun are blocked whereby the interior of the auto is maintained at a cooler temperature than otherwise allowable.

Another object of the present invention is to provide a novel sunshade for an auto window having an operative position against the inside surface of the window and a storage position which is a foldable or rollable configuration suitable for placement in a storage area of reduced area.

Another object of the present invention is to provide a novel window shade for blocking the sun's rays having attachment means about the edge marginal region of a sheet of material adapted for fastening with mated closure members carried on the window frame, sill or the auto interior liner.

Still another object of the present invention is to provide a novel auto sunshade for the side windows of an auto wherein the material is pliable and is deployed into an operative position for detachable connection with the sill or frame of the window or the headliner material of the auto interior, and which is further deployable into a storage condition when not in use.

Yet another object of the present invention is to provide a novel attachment means for the placement of an opaque sunshade against the interior surface of a side window frame wherein each fastener not only includes reinforcing means but includes a tab grasped by the user for disconnection of the closure when not in use.

It is still a primary object of the present invention to provide a novel sunshade for automobiles installable across windows to prevent sunrays from entering the auto interior and which further provides an electrical resistance heating circuit adapted to be plugged into the dashboard cigarette lighter so that the windshield or window is heated in order to prevent accumulation of smog, snow or ice.

Another object of the present invention is to provide a novel sunshade having resistance heating elements incorporated into its material which when heated will prevent fogging of the windshield and/or the accumulation of moisture thereon while the vehicle is in a parked position.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
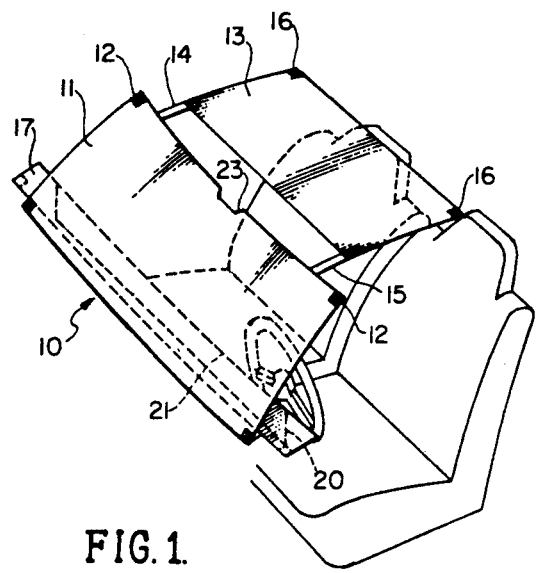
FIG. 1 is a perspective diagrammatic view showing installation of the present vehicle sunshade apparatus incorporating the present invention.

Referring to FIG. 1, the novel sunshade apparatus of the present invention is illustrated in the general direction of arrow 10 which includes an elongated sheet of opaque material 11 constituting a windshield cover and which incorporates fasteners of the hook and pile type on on the respective corners. For example, one corner includes a hook material 12 which is adhesively secured to the material of the cover 11 or which is sewn therein so as to provide reinforcement. The pile portion of the fastener may either be sewn into the interior of the vehicle or may be used in connection with the headliner or other fabric which is exposed to the interior for decorative purposes. The hook and pile fastening arrangement is provided on all of the corners of the respective sheets or cover material to be described herein.

It is also to be understood that the material of the covering sheet 11 is of a pliable nature so that it may be readily folded or rolled into a storage position when not in use so that the rolled assembly may be placed into the trunk of the car or the back seat in an orderly manner. FIG. 1 also illustrates a smaller although elongated second sheet of window covering material, as indicated by numeral 13, which may be referred to as a roof window cover. It is intended that this cover be disposed inside the vehicle underneath a roof window to prevent passage of sunrays. The opposing edge of sheet 13 facing the edge of sheet 11 is in fixed spaced-apart arrangement and is held together by means of connecting straps 14 and 15 respectively. The straps include hook and pile fasteners attached to the respective corners of the sheet 13 so that the sheet is detachably connected to the windshield 11. The opposite side of the roof window sheet 13 is provided with a hook and pile fastener as previously described and as indicated by numeral 16 so that the rear edge of the sheet may be attached to the headliner of the vehicle when in its operative position. The material is pliable so that the roof window sheet 13 is rolled or folded for storage purposes in a similar manner as that described with respect to the windshield covering sheet 11.

A third sheet of covering material is indicated by numeral 17 which is intended to cover the dashboard of the vehicle and the opposing edges of the lower portion of the windshield window covering 11 and the dashboard sheet are in spaced-apart relationship and connected by means of connecting straps 18 and 19. Therefore, it can be seen that when fully connected together by the connecting straps, the three sheets of covering material cover the inside window surface of the roof window, the windshield and the top of the dashboard. The dashboard covering sheet 13 includes a downwardly depending flap 20 that covers the front of the dashboard and is connected to the covering sheet 11 by a fold line or scored line 21.

Figure 2:
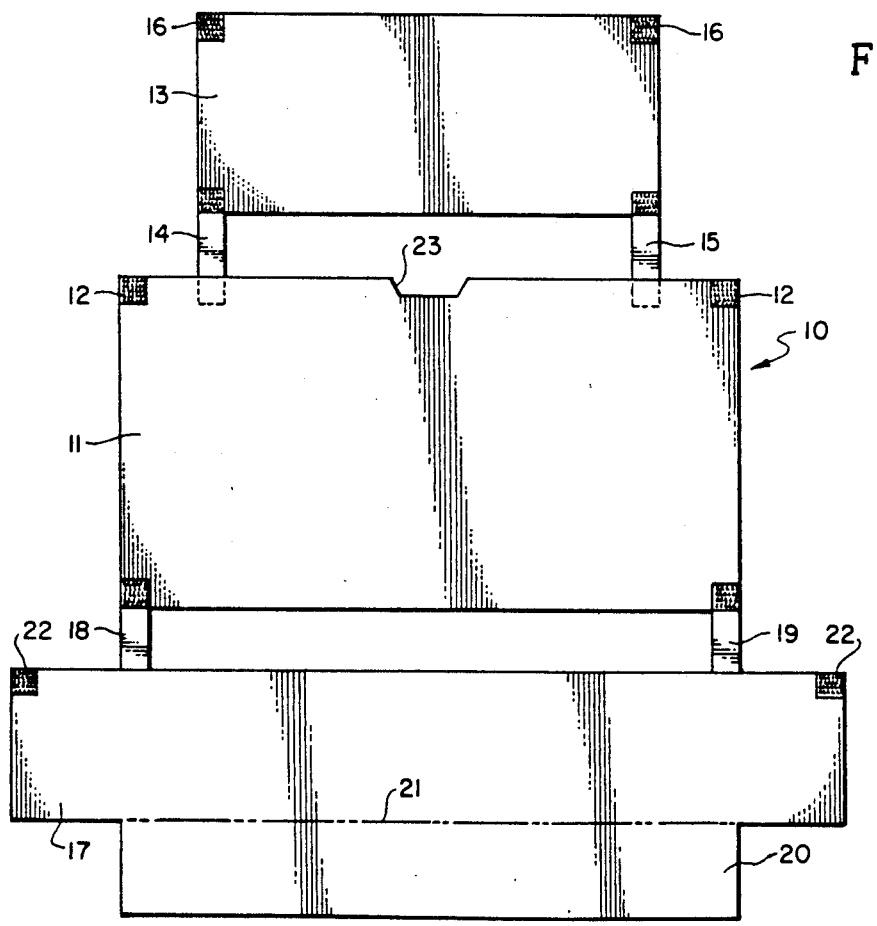
FIG. 2 is a plan view of the novel sunshade apparatus illustrating all of the components of the apparatus connected together preparatory for installation on the interior of a vehicle.

Referring now in detail to FIG. 2, it can be seen that the central windshield sheet 11 is elongated having fastening elements 12 on its respective corners so as to not only join with the headliner normally carried on the interior of a vehicle but so that other sheets may be employed and detachably connected by the connecting straps. Connecting straps 14 and 15 couple with the roof window the opposing edges of dashboard cover 17. The opposite ends of the dashboard cover 17 include fasteners, such as indicated by numeral 22, which are suitably connected to material carried on the dashboard that may be glued or otherwise attached thereto. Therefore, all of the fasteners may be of a hook and pile type. The use of such a fastener obviates the need for registration or indexing of fastener parts such as a strap and buckle or an eyelet fastening system. Also, it is to be understood that the respective covering sheets 11, 13, and 17 may be configured to formfit with the outline configuration of the window or dashboard cover. In this connection, a cutout portion 23 along the edge of the center of windshield cover 11 may be provided so as to accommodate positioning of the cover about the rearview mirror normally carried on the windshield of conventional vehicles.

Figure 3:
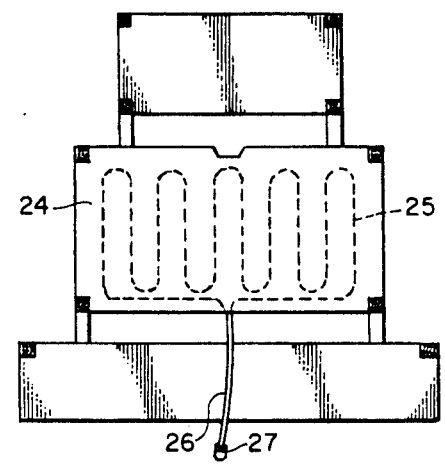
FIG. 3 is a plan view similar to the view of FIG. 2 and illustrating the windshield sheet having an electrical resistance heating element incorporated therein.

Referring now in detail to FIG. 3, another version of the invention is illustrated in which the windshield cover is indicated by numeral 24 and includes an electrical resistance heating element, such as a wire 25 embedded within the material of the cover, and having its opposite ends externally extending from the cover in the form of a cable 26 terminating in a plug 27. The plug 27 is intended to be placed into the cigarette lighter on the dashboard of the vehicle so that current will be passed through the wire for resistance heating purposes. Once heated, the heat will prevent fogging of the windshield or the collection of ice or moisture thereon.

In view of the foregoing, it can be seen that the novel shade apparatus of the present invention not only covers the large window areas in a vehicle but covers the dashboard along its top and front as well. The respective covering sheets are detachably connected to one another so that the user has the option of covering the areas at his selection. The covering sheets may be readily fabricated from such materials as pressboard, fabric or plastic as long as the material may be expanded to an operative position as shown in FIG. 2, or to a rolled up or stored position when not in use.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a shade apparatus for vehicles having a windshield, a roof window and a dashboard, the combination comprising:

an elongated windshield cover of pliable material adapted to be placed in the interior of said vehicle against said windshield;

fastening means carried on the opposite ends of said windshield cover;

said vehicle having interior material compatible with said fastening means for releasably attaching said windshield cover to said interior material;

said fastener means is a hook and pile connection means;

a roof cover adapted to be placed in the interior of said vehicle over said roof window;

fastening means releasably connecting the edge marginal region of said roof window cover to said vehicle interior material;

a dashboard cover having a downwardly depending flap attached along one edge of said dashboard cover by a fold line;

fastening means attaching said dashboard cover to said vehicle dashboard; and strap means detachably connecting said roof window cover to a selected edge marginal region of said windshield cover and detachably connecting the other edge marginal region of said windshield cover to said dashboard cover so as to provide a single unitary construction.

* * * * *